US011213876B2

(12) United States Patent
Abe

(10) Patent No.: US 11,213,876 B2
(45) Date of Patent: Jan. 4, 2022

(54) GUIDANCE DEVICE, DEVICE FOR MOVING DISC-SHAPED MEMBER, CAN LID MANUFACTURING SYSTEM AND BEVERAGE CAN MANUFACTURING SYSTEM

(71) Applicant: SHOWA ALUMINUM CAN CORPORATION, Tokyo (JP)

(72) Inventor: Katsunori Abe, Tokyo (JP)

(73) Assignee: SHOWA ALUMINUM CAN CORPORATION, Tokyo (JP)

( * ) Notice: Subject to any disclaimer, the term of this patent is extended or adjusted under 35 U.S.C. 154(b) by 79 days.

(21) Appl. No.: 16/648,231

(22) PCT Filed: Jul. 2, 2018

(86) PCT No.: PCT/JP2018/025067
§ 371 (c)(1),
(2) Date: Mar. 18, 2020

(87) PCT Pub. No.: WO2019/069517
PCT Pub. Date: Apr. 11, 2019

(65) Prior Publication Data
US 2020/0261960 A1  Aug. 20, 2020

(30) Foreign Application Priority Data
Oct. 5, 2017  (JP) .............................. JP2017-195051

(51) Int. Cl.
*B21D 51/44* (2006.01)
*B65G 21/20* (2006.01)
*B67B 3/06* (2006.01)

(52) U.S. Cl.
CPC .......... *B21D 51/446* (2013.01); *B65G 21/20* (2013.01); *B65G 21/2054* (2013.01); *B65G 21/2072* (2013.01); *B67B 3/06* (2013.01)

(58) Field of Classification Search
CPC .............. B21D 51/446; B21D 51/2653; B21D 51/2692; B65G 21/20; B65G 11/143;
(Continued)

(56) References Cited

U.S. PATENT DOCUMENTS 2,717,089 A    9/1955  Hebert
2,720,302 A *  10/1955  Madden ............... B65G 11/143
                                                  193/2 R
(Continued)

FOREIGN PATENT DOCUMENTS

JP    S5434747    10/1979
JP    S6310947    1/1988
(Continued)

OTHER PUBLICATIONS

"International Search Report (Form PCT/ISA/210) of PCT/JP2018/025067," dated Sep. 18, 2018, with English translation thereof, pp. 1-4.
(Continued)

*Primary Examiner* — Mark A Deuble
(74) *Attorney, Agent, or Firm* — JCIPRNET

(57) ABSTRACT

An upstream-side guidance part 400 is provided with plural upstream-side guidance members 410 guiding disc-shaped members 300. A downstream-side guidance part 500 is provided with plural downstream-side guidance members 510 guiding the disc-shaped members 300. The positions of the upstream-side guidance members 410 in the circumferential direction of the disc-shaped member 300 are different from the positions of the downstream-side guidance members 510 in the circumferential direction of the disc-shaped member 300, and at least one of the upstream-side guidance part 400 and the downstream-side guidance part 500 is able to move forward and backward with respect to the other.

8 Claims, 9 Drawing Sheets

(58) Field of Classification Search
CPC ............ B65G 21/2072; B65G 21/2045; B65G 21/2054; B65G 21/2063; B67B 3/06
See application file for complete search history.

(56) References Cited

U.S. PATENT DOCUMENTS

| | | | | | |
|---|---|---|---|---|---|
| 3,618,550 | A | * | 11/1971 | Mojden | B21D 51/2692 413/47 |
| 4,795,018 | A | * | 1/1989 | Anderson | B65G 11/143 193/2 C |
| 5,161,919 | A | * | 11/1992 | Smith | B65G 21/2072 406/86 |
| 7,721,876 | B2 | * | 5/2010 | Hartness | B65G 21/2072 198/836.3 |
| 9,481,524 | B2 | * | 11/2016 | Bell | B65G 21/2072 |

FOREIGN PATENT DOCUMENTS

| | | | |
|---|---|---|---|
| JP | H01118833 | | 8/1989 |
| JP | 2018072056 | A * | 5/2018 |

OTHER PUBLICATIONS

"Search Report of Europe Counterpart Application", dated May 28, 2021, p. 1-p. 12.

\* cited by examiner

GUIDANCE DEVICE, DEVICE FOR MOVING DISC-SHAPED MEMBER, CAN LID MANUFACTURING SYSTEM AND BEVERAGE CAN MANUFACTURING SYSTEM

CROSS-REFERENCE TO RELATED APPLICATION

This application is a 371 application of the international PCT application serial no. PCT/JP2018/025067, filed on Jul. 2, 2018, which claims the priority benefit of Japan Patent Application No. 2017-195051, filed on Oct. 5, 2017. The entirety of each of the above-mentioned patent applications is hereby incorporated by reference herein and made a part of this specification.

TECHNICAL FIELD

The present invention relates to a guidance device, a device for moving a disc-shaped member, a can lid manufacturing system and a beverage can manufacturing system.

BACKGROUND ART

Patent Document 1 discloses a supply position adjustment device including annular-shaped flange portions and a guidance member provided between the two flange portions, wherein a center portion surrounded by the flange portions and the guidance member forms a path for a can lid.

CITATION LIST

Patent Literature

Patent Document 1: Japanese Utility Model Application Laid-Open No. 1-118833

SUMMARY OF INVENTION

Technical Problem

In a guidance device guiding a disc-shaped member used as a can lid, it is possible to change the full length of the guidance device by arranging plural guidance members in line along a conveyance direction of a disc-shaped member and moving part of the guidance members to the upstream side and the downstream side in the conveyance direction of the disc-shaped member.

By the way, in the case where the part of the guidance members is moved, it is assumed that the part of the guidance members interferes with the other part of the guidance members positioned on the same axis as the part of the guidance members. In this case, the interference can be avoided by, for example, making one of the parts of the guidance members hollow and causing the other part of the guidance members to be inserted into the one part of the guidance members. However, in this case, due to the one part of the hollow guide members, there is a possibility that the strength of the guidance device is reduced.

An object of the present invention is to cause a guidance device guiding a disc-shaped member to be used for a can lid to be capable of changing a full length of the device while suppressing degradation of strength of the device.

Solution to Problem

A guidance device to which the present invention is applied includes: an upstream-side guidance part including plural upstream-side guidance members disposed along a conveyance route of a disc-shaped member to be conveyed in a thickness direction thereof and to be used as a can lid, the upstream-side guidance members being disposed at positions different from one another in a circumferential direction of the disc-shaped member to be conveyed, to thereby guide the disc-shaped member; and a downstream-side guidance part including plural downstream-side guidance members disposed at positions different from one another in the circumferential direction of the disc-shaped member to be conveyed, to thereby guide the disc-shaped member having been guided by the upstream-side guidance members and conveyed, wherein each of the positions of the upstream-side guidance members in the circumferential direction is different from each of the positions of the downstream-side guidance members in the circumferential direction, and at least one of the upstream-side guidance part and the downstream-side guidance part is able to move forward and backward with respect to the other.

Here, a portion where both the upstream-side guidance part and the downstream-side guidance part are positioned exists beside the conveyance route of the disc-shaped member, and guidance of the disc-shaped member by the downstream-side guidance part is started amidst performance of guidance of the disc-shaped member by the upstream-side guidance part.

Moreover, the plural upstream-side guidance members and the plural downstream-side guidance members are placed on a same circle on a plane orthogonal to a conveyance direction of the disc-shaped member, the plane passing both the upstream-side guidance part and the downstream-side guidance part.

Moreover, the upstream-side guidance members and the downstream-side guidance members are alternately disposed in a circumferential direction of the same circle.

Moreover, a fixed member to be fixed to a fixing location is attached to at least one of end portions of the plural upstream-side guidance members positioned on an upstream side in a conveyance direction of the disc-shaped member and end portions of the plural downstream-side guidance members positioned on a downstream side in the conveyance direction of the disc-shaped member, a through hole for passing a fastening member is formed in the fixed member, and the through hole is formed into an elongate-hole shape.

From another standpoint, a guidance device to which the present invention is applied includes: an upstream-side guidance part including plural upstream-side guidance members disposed along a conveyance route of a disc-shaped member to be used as a can lid, to thereby guide the disc-shaped member; and a downstream-side guidance part including plural downstream-side guidance members disposed along the conveyance route, to thereby guide the disc-shaped member having been guided by the upstream-side guidance members and conveyed, wherein a guidance region in a conveyance direction of the disc-shaped member where the upstream-side guidance part guides the disc-shaped member and a guidance region in the conveyance direction where the downstream-side guidance part guides the disc-shaped member partially overlap in the conveyance direction, and movement of at least one of the upstream-side guidance part and the downstream-side guidance part toward the other changes a length in the conveyance direction of a portion where the guidance regions overlap, and plural points in a longitudinal direction in each of the plural downstream-side guidance members constituting the downstream-side guidance part are fixed to the upstream-side guidance part, and plural points in a longitudinal direction in each of the plural upstream-side guidance members constituting the upstream-side guidance part are fixed to the downstream-side guidance part.

Here, the guidance device further includes: a first fixing member fixed to portions of the plural upstream-side guidance members positioned on a downstream side in the conveyance direction, the first fixing member coupling the plural upstream-side guidance members and being fixed to the downstream-side guidance members; and a second fixing member fixed to portions of the plural downstream-side guidance members positioned on an upstream side in the conveyance direction, the second fixing member coupling the plural downstream-side guidance members and being fixed to the upstream-side guidance members, wherein the upstream-side guidance members are fixed to the downstream-side guidance members via the first fixing member and the second fixing member, to thereby fix the plural points in the longitudinal direction of the upstream-side guidance members to the downstream-side guidance part, and the downstream-side guidance members are fixed to the upstream-side guidance members via the first fixing member and the second fixing member, to thereby fix the plural points in the longitudinal direction of the downstream-side guidance members to the upstream-side guidance part.

Moreover, plural through holes are formed in each of the first fixing member and the second fixing member, the plural through holes being along a moving direction when one of the guidance parts moves with respect to the other, and each of the plural downstream-side guidance members is passed through each of the through holes in the first fixing member, and each of the plural upstream-side guidance members is passed through each of the through holes in the second fixing member.

Moreover, in the case where the present invention is grasped as a device for moving a disc-shaped member, the device for moving a disc-shaped member to which the present invention is applied includes: a conveyance device providing a driving force to a disc-shaped member to be used as a can lid and conveying the disc-shaped member; and a guidance device guiding the disc-shaped member conveyed by the conveyance device, wherein the guidance device includes any one of the above-described guidance devices.

Moreover, in the case where the present invention is grasped as a can lid manufacturing system, the can lid manufacturing system to which the present invention is applied includes: a conveyance device providing a driving force to a disc-shaped member to be used as a can lid and conveying the disc-shaped member; a guidance device guiding the disc-shaped member conveyed by the conveyance device; and a processor performing predetermined processing to the disc-shaped member, wherein the guidance device includes any one of the above-described guidance devices.

Moreover, in the case where the present invention is grasped as a beverage can manufacturing system, the beverage can manufacturing system to which the present invention is applied includes: a conveyance device providing a driving force to a disc-shaped member to be used as a can lid and conveying the disc-shaped member; a guidance device guiding the disc-shaped member conveyed by the conveyance device; and an attaching device attaching the disc-shaped member to an opening portion of a can lid filled with a beverage, wherein the guidance device includes any one of the above-described guidance devices.

Advantageous Effects of Invention

According to the present invention, it is possible to cause a guidance device guiding a disc-shaped member to be used for a can lid to be capable of changing a full length of the device while suppressing degradation of strength of the device.

DESCRIPTION OF EMBODIMENTS

Hereinafter, an exemplary embodiment according to the present invention will be described in detail with reference to attached drawings.

Figure 1:
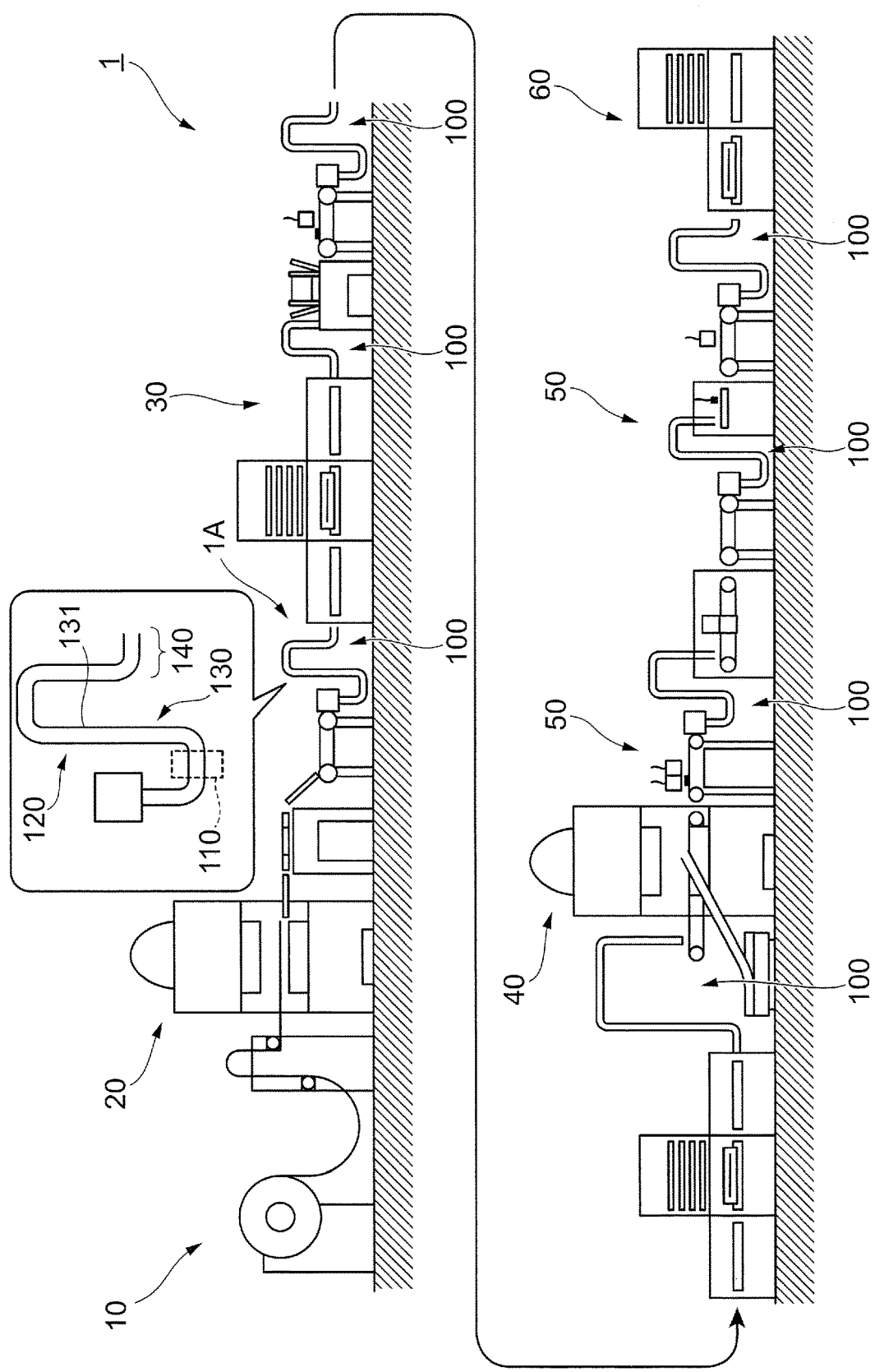
FIG. 1 is a diagram showing a can lid manufacturing system related to the exemplary embodiment.

FIG. 1 is a diagram showing a can lid manufacturing system 1 related to the exemplary embodiment.

The can lid manufacturing system 1 of the exemplary embodiment is provided with a delivery device 10 delivering a base material in an extended state from the base material in a rolled state. Moreover, the can lid manufacturing system 1 is provided with a first press device 20, a sealing agent application device 30 and a second press device 40, each of which performs a predetermined process on the base material.

The first press device 20 performs a punching process and a rough-molding process on the base material delivered by the delivery device 10 to thereby form a member in a disc shape having a flange at an outer circumferential edge thereof (hereinafter, referred to as "disc-shaped member"). Thereafter, in the exemplary embodiment, a curling process (a hemming process) (not shown) is performed on the outer circumferential portion of the disc-shaped member.

Next, in the exemplary embodiment, the sealing agent application device 30 as an example of a processing device applies a sealing agent to one surface of the disc-shaped member.

Thereafter, in the exemplary embodiment, in the second press device 40, a die is pressed against the disc-shaped member, to which the sealing agent has been applied, to thereby put a tap (to form a groove (a score) for an opening). Moreover, in the second press device 40, a tab for the opening is attached.

When processing by the second press device 40 is finished, a can lid to which a tab has been attached is completed. The completed can lid is conveyed to a packing device 60 through an inspection device 50.

[Overall Configuration of Device for Moving Disc-Shaped Member]

Further, the can lid manufacturing system 1 of the exemplary embodiment is provided with moving devices 100 (an example of a device for moving a disc-shaped member) moving the disc-shaped member between the respective devices.

The moving device 100 indicated by a reference sign 1A is provided with a conveyance device 110 giving a driving force to the disc-shaped member to convey the disc-shaped member to the downstream side, and a guidance device 120 guiding the disc-shaped member conveyed by the conveyance device 110.

The guidance device 120 is configured with a guidance device main body part 130 and an extendable part 140 positioned on a downstream side of the guidance device main body part 130.

The guidance device main body part 130 is provided with a guidance member 131 that is in a round bar shape along a conveyance route of the disc-shaped member, the guidance member 131 being disposed around the conveyance route of the disc-shaped member. In the guidance device main body part 130, the disc-shaped member is guided by the guidance member 131.

The extendable part 140 is disposed between the sealing agent application device 30 positioned on the downstream side and the guidance device main body part 130 to connect the sealing agent application device 30 and the guidance device main body part 130.

Note that, in the moving devices 100 other than the moving device 100 indicated by the reference sign 1A, the conveyance device 110 and the guidance device 120 are provided in a similar manner.

[Details of Can Lid, Can Main Body and so on]

In the can lid manufacturing system 1 of the exemplary embodiment, a can lid to be attached to a can main body (not shown) for beverage is manufactured. The manufactured can lid is attached to a can main body (not shown) that has been filled with the beverage. More specifically, the manufactured can lid is an opening portion of the cylindrical can main body, and is attached to an opening portion of the can main body after the can main body has been filled with the beverage through the opening portion. Consequently, a beverage can filled with a beverage is completed.

Here, examples of the can lid manufactured by the can lid manufacturing system 1 of the exemplary embodiment include a can lid made of metal. More specifically, the examples include a can lid composed of aluminum or an aluminum alloy.

Moreover, in the can lid manufacturing system 1 of the exemplary embodiment, a can lid in which a tab is not separated from the can lid even after the opening is formed in the can lid, namely, a can lid with a so-called stay-on-tab (SOT) is formed.

Moreover, examples of the can main body, to which the can lid manufactured by the can lid manufacturing system 1 of the exemplary embodiment is to be attached, include a can main body made of metal.

More specifically, the examples include a can main body manufactured by performing drawing and ironing (DI) molding on aluminum or an aluminum alloy. In addition, other than the above, the examples of the can main body include a two-piece can made of aluminum or an aluminum alloy.

Moreover, examples of a beverage to be packaged inside the can main body include an alcoholic beverage, such as beer or Chuhai, or a soft drink (non-alcoholic beverage).

[Description of Conveyance Device 110]

Figure 2:
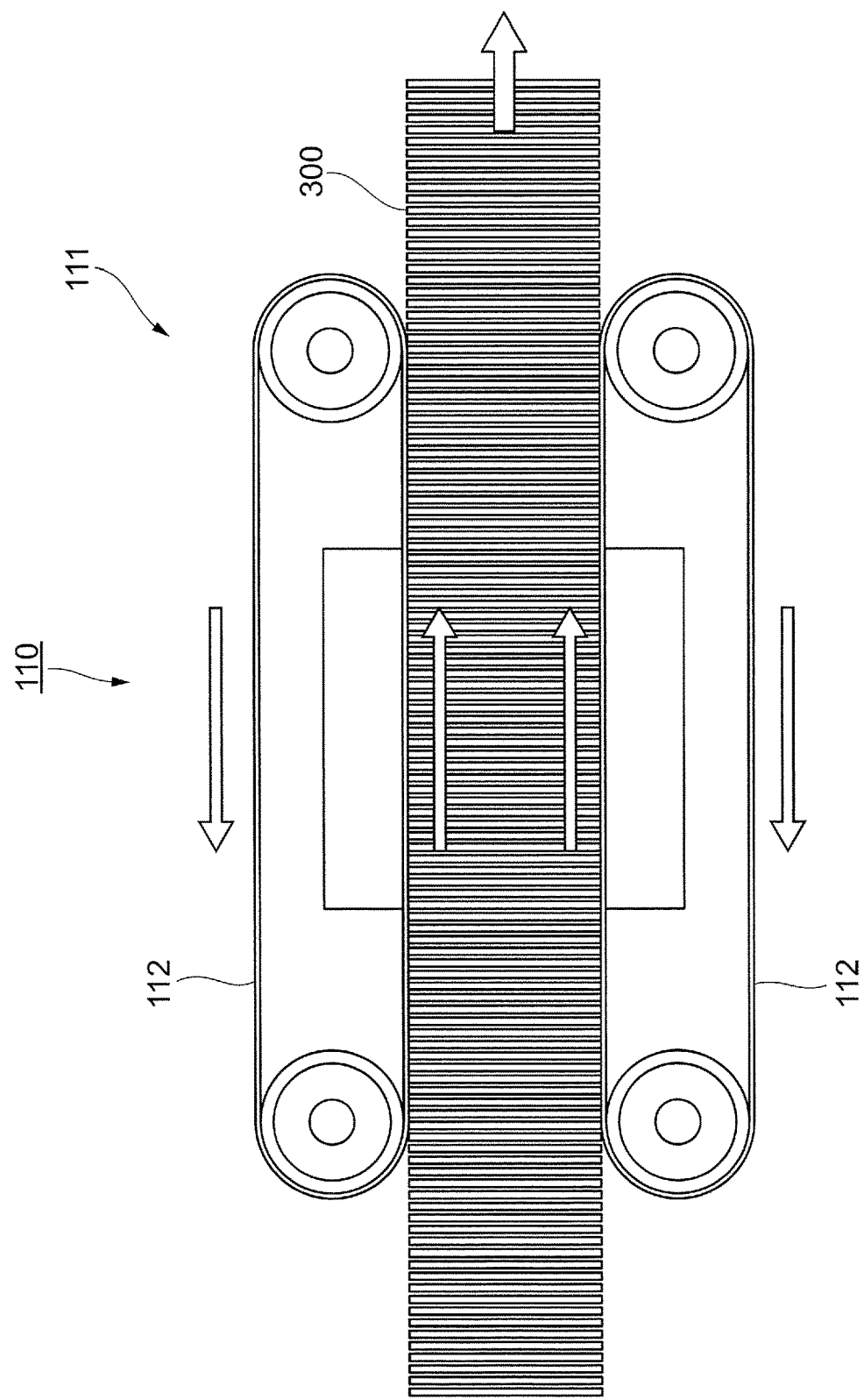
FIG. 2 is a diagram in the case where a conveyance device provided to a moving device is viewed from above.

FIG. 2 is a diagram in the case where the conveyance device 110 provided to the moving device 100 is viewed from above.

The conveyance device 110 gives a driving force to a disc-shaped member 300 to convey the disc-shaped member 300 toward the downstream side.

Specifically, the conveyance device 110 is provided with a driving force supply device 111 that gives a driving force to the disc-shaped member 300 to convey thereof. The driving force supply device 111 is provided with belt members 112 that are positioned at both sides of the conveyance route of the disc-shaped member 300 to perform circulating movement.

In the exemplary embodiment, when the disc-shaped member 300 reaches the driving force supply device 111, the belt members 112 are brought into contact with the disc-shaped member 300 from the both sides thereof. This gives the driving force (propulsive force) to the disc-shaped member 300, and thereby the disc-shaped member 300 is conveyed to the downstream side.

Note that, in the moving device 100 (the conveyance device 110 and the guidance device 120), the disc-shaped members 300 are laminated in a thickness direction and conveyed in the thickness direction.

[Description of Extendable Part 140]

Figure 3:
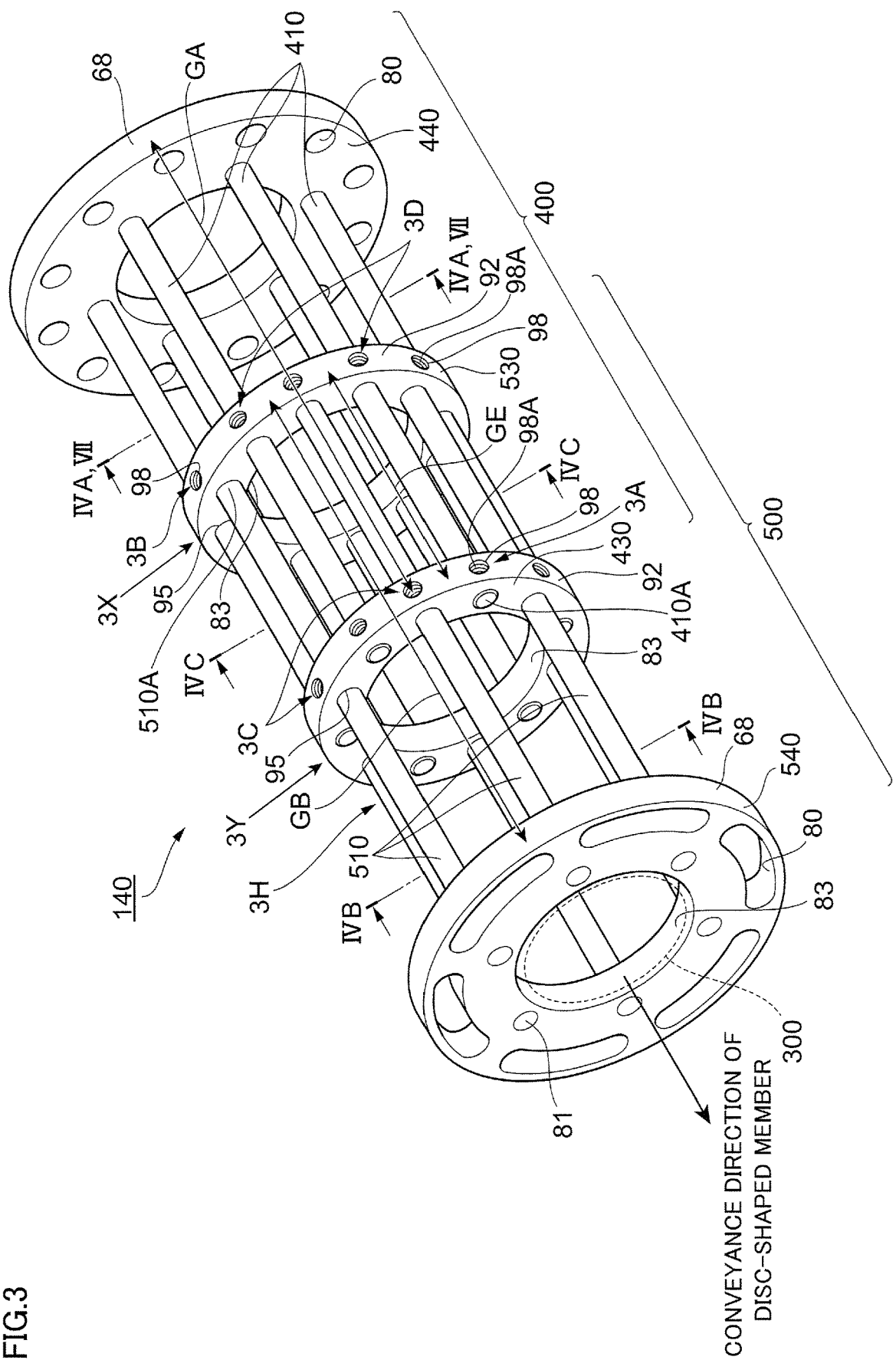
FIG. 3 is a perspective view showing an extendable part of the guidance device.

FIG. 3 is a perspective view showing the extendable part 140 of the guidance device 120.

Note that, only the single disc-shaped member 300 is shown in FIG. 3; however, in actuality, the disc-shaped members 300 are laminated in the thickness direction and conveyed in the thickness direction as shown in FIG. 2. In addition, FIG. 3 shows a case where the extendable part 140 is viewed from the downstream side in the conveyance direction of the disc-shaped member 300.

Figure 4A:
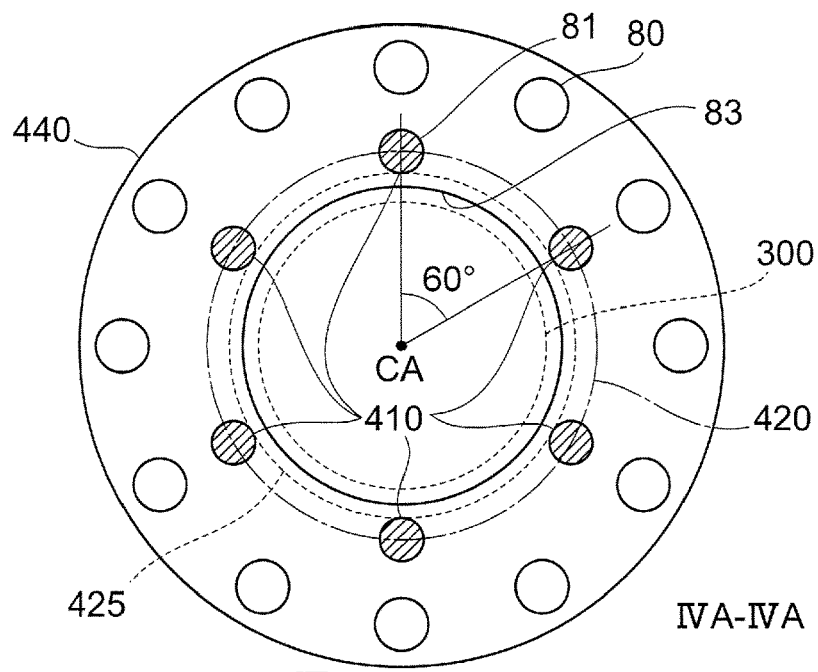
FIGS. 4A to 4C are cross-sectional views of the extendable part.
Figure 4B:
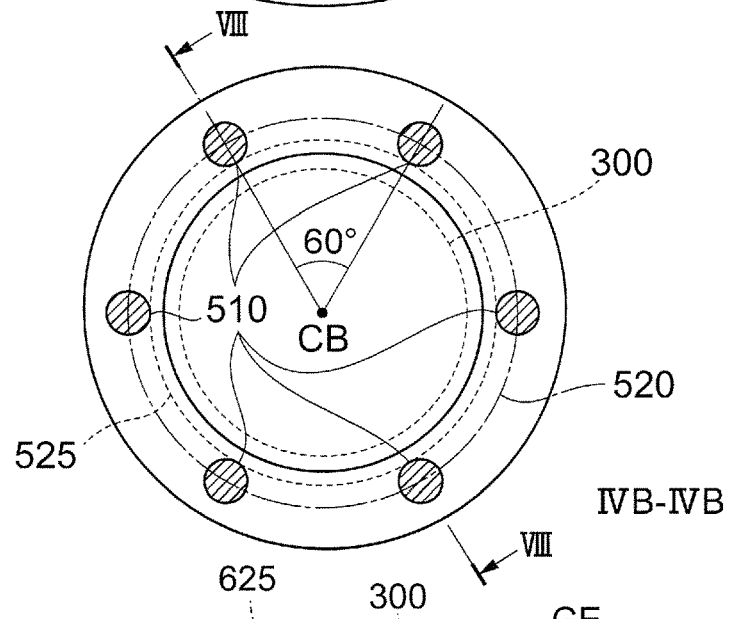
Figure 4C:
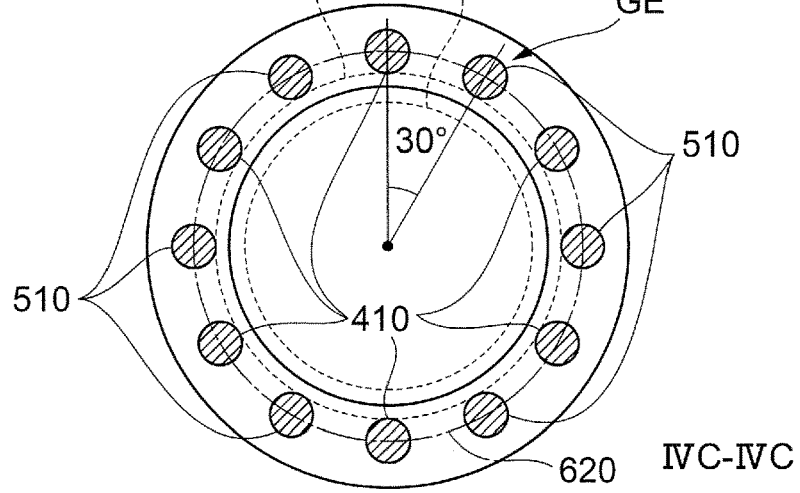

Moreover, FIGS. 4A to 4C are cross-sectional views of the extendable part 140.

Specifically, FIG. 4A is a cross-sectional view of the extendable part 140 along the IVA-IVA line in FIG. 3, FIG. 4B is a cross-sectional view of the extendable part 140 along the IVB-IVB line in FIG. 3, and FIG. 4C is a cross-sectional view of the extendable part 140 along the IVC-IVC line in FIG. 3.

As shown in FIG. 3, the extendable part 140 is provided with an upstream-side guidance part 400 guiding the disc-shaped members 300 and a downstream-side guidance part 500 guiding the disc-shaped members 300.

The upstream-side guidance part 400 guides the disc-shaped members 300 that have been guided by the guidance device main body part 130 (refer to FIG. 1). The downstream-side guidance part 500 guides the disc-shaped members 300 that have been conveyed while being guided by the upstream-side guidance part 400.

In the exemplary embodiment, in the conveyance direction of the disc-shaped members 300 (hereinafter, simply referred to as a "conveyance direction"), the installation region of the upstream-side guidance part 400 and the installation region of the downstream-side guidance part 500 partially overlap.

To additionally describe, in the exemplary embodiment, a guidance region GA in which the upstream-side guidance part 400 guides the disc-shaped members 300 and a guidance region GB in which the downstream-side guidance part 500 guides the disc-shaped members 300 partially overlap in the conveyance direction.

More specifically, in the exemplary embodiment, the guidance region GA that is a guidance region by the upstream-side guidance part 400 in the conveyance direction and the guidance region GB that is a guidance region by the downstream-side guidance part 500 in the conveyance direction partially overlap in the conveyance direction.

Note that, in the exemplary embodiment, a portion where the guidance region GA in which the upstream-side guidance part 400 guides the disc-shaped members 300 and the guidance region GB in which the downstream-side guidance part 500 guides the disc-shaped members 300 overlap is hereinafter referred to as an "overlapping portion GE."

To put it another way, in the exemplary embodiment, there is a portion where both the upstream-side guidance part 400 and the downstream-side guidance part 500 are positioned beside the conveyance route of the disc-shaped members 300.

Consequently, in the exemplary embodiment, guidance of the disc-shaped members 300 by the downstream-side guidance part 500 is started in the middle of the guidance of the disc-shaped members 300 by the upstream-side guidance part 400.

In other words, in the exemplary embodiment, the disc-shaped members 300 are guided by both the upstream-side guidance part 400 and the downstream-side guidance part 500 in the overlapping portion GE.

The upstream-side guidance part 400 is provided with plural upstream-side guidance members 410 in the round bar shape.

The plural upstream-side guidance members 410 are disposed along the conveyance route of the disc-shaped members 300 to be conveyed.

In addition, as shown in FIG. 4A, the plural upstream-side guidance members 410 are disposed around the conveyance route of the disc-shaped members 300.

Further, as shown in FIG. 4A, the plural upstream-side guidance members 410 are disposed so that the positions thereof in the circumferential direction of the disc-shaped members 300 to be conveyed are different from one another. More specifically, the plural upstream-side guidance members 410 are disposed to be placed on a circle (a virtual circle) 420 positioned around the conveyance route of the disc-shaped members 300.

In the exemplary embodiment, the disc-shaped members 300 pass through the inside of the plurally-provided upstream-side guidance members 410 (on the center portion side of the circle 420 on which the plurally-provided upstream-side guidance members 410 are placed).

Moreover, as shown in FIG. 3, the downstream-side guidance part 500 is also provided with plural downstream-side guidance members 510 in the round bar shape.

As shown in FIG. 4B, the plural downstream-side guidance members 510 are disposed around the conveyance route of the disc-shaped members 300. Further, as shown in FIG. 4B, the plural downstream-side guidance members 510 are also disposed so that the positions thereof in the circumferential direction of the disc-shaped members 300 to be conveyed are different from one another.

Moreover, as shown in FIG. 4B, the plural downstream-side guidance members 510 are also disposed to be placed on a circle (a virtual circle) 520 positioned around the conveyance route of the disc-shaped members 300. Then, in the exemplary embodiment, the disc-shaped members 300 pass through the inside of the plurally-provided downstream-side guidance members 510.

The upstream-side guidance member 410 and the downstream-side guidance member 510 are just required to have good anticorrosion properties, scratch resistance, abrasion resistance, lubricating properties, strength and the like; the members are formed by, for example, stainless steel.

Note that the upstream-side guidance member 410 and the downstream-side guidance member 510 may be formed by other materials, not limited to the stainless steel. Moreover, the upstream-side guidance member 410 and the downstream-side guidance member 510 may have a configuration in which a surface of a base material in a columnar shape is covered with a member configured with a material other than the material of the base material.

FIG. 4C is a cross-sectional view along the IVC-IVC line in FIG. 3.

To put it another way, FIG. 4C is a cross-sectional view in a plane orthogonal to the conveyance direction of the disc-shaped members 300, the plane passing both the upstream-side guidance part 400 and the downstream-side guidance part 500. In other words, FIG. 4C is a cross-sectional view in a plane orthogonal to the conveyance direction of the disc-shaped members 300, the plane passing the overlapping portion GE.

In the exemplary embodiment, as described above, the guidance region GA in which the upstream-side guidance part 400 guides the disc-shaped members 300 and the guidance region GB in which the downstream-side guidance part 500 guides the disc-shaped members 300 overlap in the overlapping portion GE.

More specifically, in the exemplary embodiment, among the upstream-side guidance members 410 constituting the upstream-side guidance part 400, the downstream-side guidance members 510 constituting the downstream-side guidance part 500 are respectively inserted.

Consequently, the guidance region GA of the upstream-side guidance part 400 and the guidance region GB of the downstream-side guidance part 500 overlap.

In this case, as shown in FIG. 4C, both the upstream-side guidance members 410 and the downstream-side guidance members 510 appear in the overlapping portion GE.

As shown in FIG. 4C, in the overlapping portion GE, the plural upstream-side guidance members 410 and the plural downstream-side guidance members 510 are placed on the same circle (virtual circle) 620. Moreover, in the circumferential direction of the same circle 620, the upstream-side guidance members 410 and the downstream-side guidance members 510 are alternately disposed.

Further, in the exemplary embodiment, as shown in FIG. 4C, in the circumferential direction of the disc-shaped members 300 to be conveyed (in the circumferential direction of the circle 620), the position of each of the upstream-side guidance members 410 is different from the position of each of the downstream-side guidance members 510.

Further, in the exemplary embodiment, as shown in FIGS. 4A and 4C, six upstream-side guidance members 410 are provided.

In the case of assuming a regular hexagon (not shown) whose center portion is positioned at a center CA of the circle 420 (refer to FIG. 4A) on which each of the upstream-side guidance members 410 is placed, the upstream-side guidance members 410 are disposed to be positioned at respective vertex portions of the regular hexagon. To put it another way, the upstream-side guidance members 410 are disposed at intervals of 60° in the circumferential direction of the disc-shaped member 300.

Similarly, as shown in FIGS. 4B and 4C, six downstream-side guidance members 510 are also provided. In addition, regarding the downstream-side guidance members 510, a regular hexagon (not shown), whose center portion is positioned at a center CB of the circle 520 (refer to FIG. 4B) on which each of the downstream-side guidance members 510 is placed, is disposed so that the downstream-side guidance members 510 are disposed to be positioned at respective vertex portions of the regular hexagon.

Further, as shown in FIG. 4B, the downstream-side guidance members 510 are disposed at intervals of 60° in the circumferential direction of the disc-shaped member 300.

Still further, in the exemplary embodiment, as shown in FIG. 4C, the upstream-side guidance members 410 and the downstream-side guidance members 510 are disposed at intervals of 30° in the circumferential direction of the disc-shaped member 300.

Note that each number of the upstream-side guidance members 410 and the downstream-side guidance members 510 is not particularly limited. However, it is necessary to set each number of the upstream-side guidance members 410 and the downstream-side guidance members 510 to prevent the disc-shaped members 300 from falling. The preferable number of each of the upstream-side guidance members 410 and the downstream-side guidance members 510 to be provided is four to six.

If there are too many upstream-side guidance members 410 and the downstream-side guidance members 510, resistive forces acting on the disc-shaped members 300 from the upstream-side guidance members 410 and the downstream-side guidance members 510 are increased, and thereby it becomes difficult for the disc-shaped members 300 to move.

Moreover, if there are too many upstream-side guidance members 410 and the downstream-side guidance members 510, costs of the moving device 100 are increased.

In the exemplary embodiment, a gap positioned between the upstream-side guidance member 410 and the disc-shaped member 300 to be conveyed (a difference between an inscribed circle in the plural upstream-side guidance members 410 and the diameter of the disc-shaped member 300) is set at a size that makes it possible to smoothly convey the disc-shaped member 300.

Similarly, a gap positioned between the downstream-side guidance member 510 and the disc-shaped member 300 to be conveyed (a difference between an inscribed circle in the plural downstream-side guidance members 510 and the diameter of the disc-shaped member 300) is also set at a size that makes it possible to smoothly convey the disc-shaped member 300.

Here, if the gap is too small, jamming of the disc-shaped members 300 or scratches on the outer circumferential edge of the disc-shaped member 300 is likely to occur.

In addition, if the gap is too large, the disc-shaped members 300 are likely to be slanted, or jamming of the disc-shaped members 300 is likely to occur. Moreover, if the gap is too large, there is a possibility that the disc-shaped member 300 drops through a gap between the upstream-side guidance members 410 adjacent to each other or a gap between the downstream-side guidance members 510 adjacent to each other.

Moreover, in the exemplary embodiment, the diameter of a circle 425 shown in FIG. 4A, the diameter of a circle 525 shown in FIG. 4B and the diameter of a circle 625 shown in FIG. 4C are equal to one another.

To put it another way, the diameter of the inscribed circle of the plural upstream-side guidance members 410 and the diameter of the inscribed circle of the plural downstream-side guidance members 510 are equal to each other.

To additionally describe, in the exemplary embodiment, the gap formed between the upstream-side guidance members 410 and the disc-shaped member 300 and the gap formed between the downstream-side guidance members 510 and the disc-shaped member 300 are equal to each other.

Consequently, as compared to the case in which the gaps are not equal, troubles such as the disc-shaped members 300 being caught on the downstream-side guidance members 510 are less likely to occur.

With reference to FIG. 3 again, the extendable part 140 will be further described.

The upstream-side guidance part 400 is provided with a first fixing member 430 in an annular shape (a flange shape). The first fixing member 430 is fixed at a portion of the plurally-provided upstream-side guidance members 410, the portion being positioned at the downstream side in the conveyance direction. More specifically, the first fixing member 430 is fixed at end portions in the downstream side of the plurally-provided upstream-side guidance members 410.

Moreover, the downstream-side guidance part 500 is also provided with a second fixing member 530 in an annular shape (a flange shape). The second fixing member 530 is fixed at a portion of the plurally-provided downstream-side guidance members 510, the portion being positioned at the upstream side in the conveyance direction. More specifically, the second fixing member 530 is fixed at end portions in the upstream side of the plurally-provided downstream-side guidance members 510.

Here, the first fixing member 430 connects the plural upstream-side guidance members 410, and the second fixing member 530 connects the plural downstream-side guidance members 510.

Moreover, the upstream-side guidance part 400 is provided with an upstream-side fixed member 440, and the downstream-side guidance part 500 is provided with a downstream-side fixed member 540.

The upstream-side fixed member 440 is formed into an annular shape (a flange shape). Moreover, the upstream-side fixed member 440 is fixed at end portions on the upstream side of the plural upstream-side guidance members 410.

The upstream-side fixed member 440 has a function of coupling the end portions on the upstream side of the plural upstream-side guidance members 410. In addition, the upstream-side fixed member 440 is fixed to the guidance device main body part 130 (refer to FIG. 1), to thereby perform positioning of the extendable part 140 with respect to the guidance device main body part 130.

Moreover, the downstream-side fixed member 540 is also formed into an annular shape (a flange shape). The downstream-side fixed member 540 is fixed at end portions on the downstream side of the plural downstream-side guidance members 510.

The downstream-side fixed member 540 has a function of coupling the plural downstream-side guidance members 510. In addition, the downstream-side fixed member 540 is fixed to a fixing location positioned on the downstream side of the downstream-side fixed member 540. Specifically, the downstream-side fixed member 540 is fixed to the sealing agent application device 30 (refer to FIG. 1).

Each of the upstream-side fixed member 440 and the downstream-side fixed member 540 is formed into the annular shape, and inside an outer circumferential edge 68, plural through holes 80 are formed along the thickness direction. In the exemplary embodiment, bar-shaped fastening members, such as bolts, are inserted into the through holes 80.

Then, the upstream-side fixed member 440 is fixed to the guidance device main body part 130 by use of the fastening members. Moreover, the downstream-side fixed member 540 is fixed to the sealing agent application device 30.

Here, in the exemplary embodiment, the through holes 80 formed in the downstream-side fixed member 540 have an elongate-hole shape. More specifically, the through holes 80 formed in the downstream-side fixed member 540 have an elongate-hole shape extending in the circumferential direction of the downstream-side fixed member 540.

The through holes 80 formed in the elongate-hole shape as described above makes it possible to fix the downstream-side fixed member 540 to the fixing location with ease as compared to the case in which the through holes 80 are formed as circular holes.

More specifically, if the through holes 80 are formed as the circular holes, in the case where bolt holes or the like formed at the fixing location are deviated from the through holes 80, it becomes difficult to fix the downstream-side fixed member 540 to the fixing location. In contrast thereto, if the through holes 80 are formed as elongate holes, it becomes possible to easily fix the downstream-side fixed member 540 to the fixing location.

Note that, in the exemplary embodiment, the through holes 80 formed in the downstream-side fixed member 540 had the elongate-hole shape; however, the through holes 80 formed in the upstream-side fixed member 440 may have the elongate-hole shape. In addition, the through holes 80 may have the elongate-hole shape in both the upstream-side fixed member 440 and the downstream-side fixed member 540.

Moreover, as shown in FIG. 4A, in the upstream-side fixed member 440, fixing holes 81 for fixing the upstream-side guidance members 410 are provided inside the through holes 80 in the radial direction of the upstream-side fixed member 440.

In the exemplary embodiment, the upstream-side guidance members 410 are fixed to the upstream-side fixed member 440 by inserting the end portions of the upstream-side guidance members 410 into the fixing holes 81 and performing welding.

Moreover, as shown in FIG. 4A, in the upstream-side fixed member 440, a passing through hole 83 for passing the disc-shaped members 300 is formed at the center portion in the radial direction of the upstream-side fixed member 440.

Moreover, the same is true in the downstream-side fixed member 540; in the downstream-side fixed member 540, as shown in FIG. 3, the fixing holes 81 for fixing the downstream-side guidance members 510 are provided inside the through holes 80 in the radial direction of the downstream-side fixed member 540. In the exemplary embodiment, the downstream-side guidance members 510 are fixed to the downstream-side fixed member 540 by inserting the end portions of the downstream-side guidance members 510 into the fixing holes 81 and performing welding.

Moreover, in the downstream-side fixed member 540, the passing through hole 83 for passing the disc-shaped members 300 is also formed at the center portion in the radial direction of the downstream-side fixed member 540.

Moreover, as shown in FIG. 3, in the exemplary embodiment, through holes 95 are formed in each of the first fixing member 430 and the second fixing member 530.

Plural through holes 95 are formed and disposed at predetermined regular intervals (equally spaced intervals) along the circumferential direction of each of the first fixing member 430 and the second fixing member 530.

Here, the through holes 95 formed in each of the first fixing member 430 and the second fixing member 530 are formed along the moving-forward and -backward direction when one of the upstream-side guidance part 400 and the downstream-side guidance part 500 moves forward or the backward (details thereof will be described later) with respect to the other.

Moreover, in each of the first fixing member 430 and the second fixing member 530, the passing through hole 83 for passing the disc-shaped members 300 is also formed at the center portion in the radial direction.

As shown in FIG. 3, in the exemplary embodiment, the plural upstream-side guidance members 410 are passed through the respective through holes 95 in the second fixing member 530, and the plural downstream-side guidance members 510 are passed through the respective through holes 95 in the first fixing member 430.

More specifically, the upstream-side guidance members 410 are passed through the through holes 95 positioned alternately, of the plural through holes 95 formed in the second fixing member 530.

Further, in the exemplary embodiment, the end portions of the downstream-side guidance members 510 (the end portions on the upstream side) are inserted into the through holes 95 positioned between the through holes 95 through which the upstream-side guidance members 410 are passed, among the plural through holes 95 formed in the second fixing member 530.

To additionally describe, in the exemplary embodiment, the through holes 95 of the same number as the sum of the installed number of the upstream-side guidance members 410 and the installed number of the downstream-side guidance members 510 are formed in the second fixing member 530.

Then, in the exemplary embodiment, the upstream-side guidance members 410 are passed through a part of the through holes 95, and the end portions of the downstream-side guidance members 510 are inserted into the other part of the through holes 95.

More specifically, in the second fixing member 530, twelve through holes 95 are formed. Then, the upstream-side guidance members 410 are passed through six through holes 95, and the end portions of the downstream-side guidance members 510 are inserted into the other six through holes 95.

Moreover, the downstream-side guidance members 510 are passed through the through holes 95 positioned alternately, of the plural through holes 95 formed in the first fixing member 430.

Further, in the exemplary embodiment, the end portions of the upstream-side guidance members 410 (the end portions on the upstream side) are inserted into the through holes 95 positioned between the through holes 95 through which the downstream-side guidance members 510 are passed, among the plural through holes 95 formed in the first fixing member 430.

To additionally describe, in the exemplary embodiment, the through holes 95 of the same number as the sum of the installed number of the upstream-side guidance members 410 and the installed number of the downstream-side guidance members 510 are formed in the first fixing member 430, and the downstream-side guidance members 510 are passed through a part of the through holes 95, and the end portions of the upstream-side guidance members 410 are inserted into the other part of the through holes 95.

More specifically, in the first fixing member 430, twelve through holes 95 are formed. Then, the downstream-side guidance members 510 are passed through six through holes 95, and the end portions of the upstream-side guidance members 410 are inserted into the other six through holes 95.

Moreover, as shown in FIG. 3, in each of the first fixing member 430 and the second fixing member 530, screw through holes 98 corresponding to the respective through holes 95 are formed.

On an inner circumferential surface 98A of the screw through hole 98, a spiral-shaped female thread is formed. In addition, the screw through hole 98 is formed from the outer circumferential surface 92 of each of the first fixing member 430 and the second fixing member 530 toward the passing through hole 83.

In the exemplary embodiment, (the end portion 410A on the downstream side of) the upstream-side guidance member 410 is fixed to the first fixing member 430 by attaching a screw to the screw through hole 98 (the screw through hole 98 indicated by a reference sign 3A) and pressing the tip end of the screw against the upstream-side guidance member 410.

Moreover, (the end portion 510A on the upstream side of) the downstream-side guidance member 510 is fixed to the second fixing member 530 by attaching a screw to the screw through hole 98 (the screw through hole 98 indicated by a reference sign 3B) and pressing the tip end of the screw against the downstream-side guidance member 510.

Further, in the exemplary embodiment, the upstream-side guidance part 400 is fixed to the downstream-side guidance part 500 by attaching screws to the screw through holes 98 (the screw through holes 98 indicated by a reference sign 3C) in the first fixing member 430 and pressing the tip ends of the screws against the downstream-side guidance members 510.

Moreover, in the exemplary embodiment, the downstream-side guidance part 500 is fixed to the upstream-side guidance part 400 by attaching screws to the screw through holes 98 (the screw through holes 98 indicated by a reference sign 3D) in the second fixing member 530 and pressing the tip ends of the screws against the upstream-side guidance members 410.

Note that the first fixing member 430, the second fixing member 530, the upstream-side fixed member 440 and the downstream-side fixed member 540 are just required to have good anticorrosion properties, scratch resistance, abrasion resistance, lubricating properties, strength and the like; therefore, it is preferable that the members are formed of stainless steel. Note that the members may be formed by other materials, not limited to the stainless steel. In addition, each of the first fixing member 430, the second fixing member 530, the upstream-side fixed member 440 and the downstream-side fixed member 540 may have a configuration in which a surface of an annular-shaped member is covered with a material other than the material of the annular-shaped member.

Here, the exemplary embodiment has a configuration in which one of the upstream-side guidance part 400 and the downstream-side guidance part 500 is capable of moving forward and backward with respect to the other, and the moving forward and backward changes the full length of the extendable part 140.

More specifically, in the exemplary embodiment, the downstream-side guidance members 510, the second fixing member 530 and the downstream-side fixed member 540 are unitized as one piece.

Then, for example, the unitized portion is moved toward the upstream-side guidance part 400, to thereby contract the extendable part 140. To the contrary, the unitized portion is moved in a direction away from the upstream-side guidance part 400, to thereby extend the extendable part 140.

Similarly, the upstream-side guidance members 410, the first fixing member 430 and the upstream-side fixed member 440 are unitized as one piece, and thereby the extendable part 140 is contracted by moving the unitized portion toward the downstream-side guidance part 500.

In addition, to the contrary, the unitized portion is moved in a direction away from the downstream-side guidance part 500, to thereby extend the extendable part 140.

To additionally describe, in the exemplary embodiment, two unitized portions are provided; further, the two unitized portions are disposed so that a part of each thereof overlaps in the conveyance direction while the portions are deviated from each other in the circumferential direction of the disc-shaped member 300.

Then, in the exemplary embodiment, when one unitized portion is moved forward or backward with respect to the other unitized portion, the extendable part 140 contracts or extends.

Figure 5:
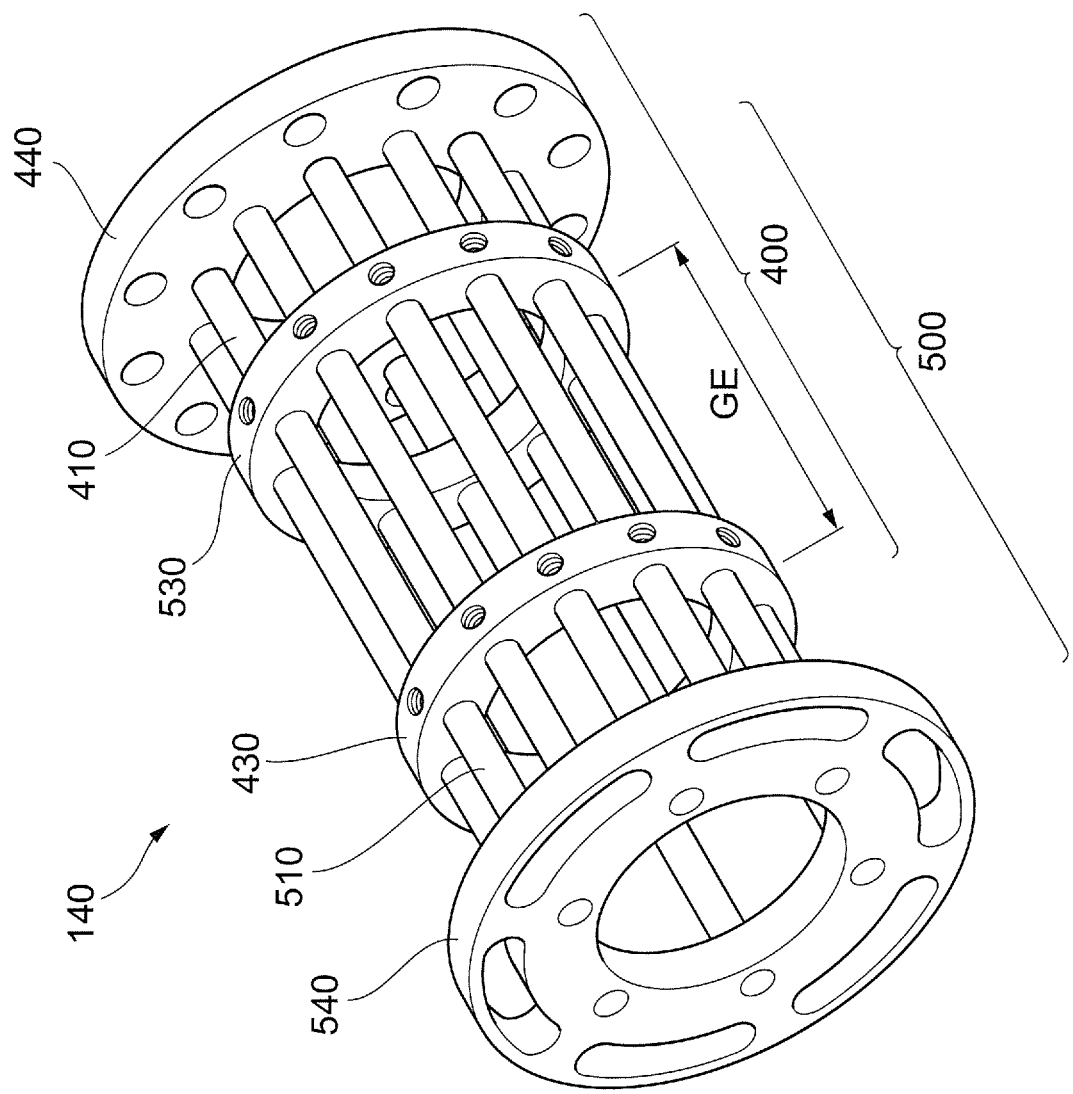
FIG. 5 is a diagram showing a state of the extendable part after the extendable part is contracted.

FIG. 5 is a diagram showing a state of the extendable part 140 after the extendable part 140 is contracted.

When the extendable part 140 is contracted, the upstream-side fixed member 440 and the downstream-side fixed member 540 approach each other. This reduces the full length of the extendable part 140.

Note that, when the extendable part 140 is contracted, the length of the overlapping portion GE positioned between the first fixing member 430 and the second fixing member 530 (the separation distance between the first fixing member 430 and the second fixing member 530) is increased.

Figure 6:
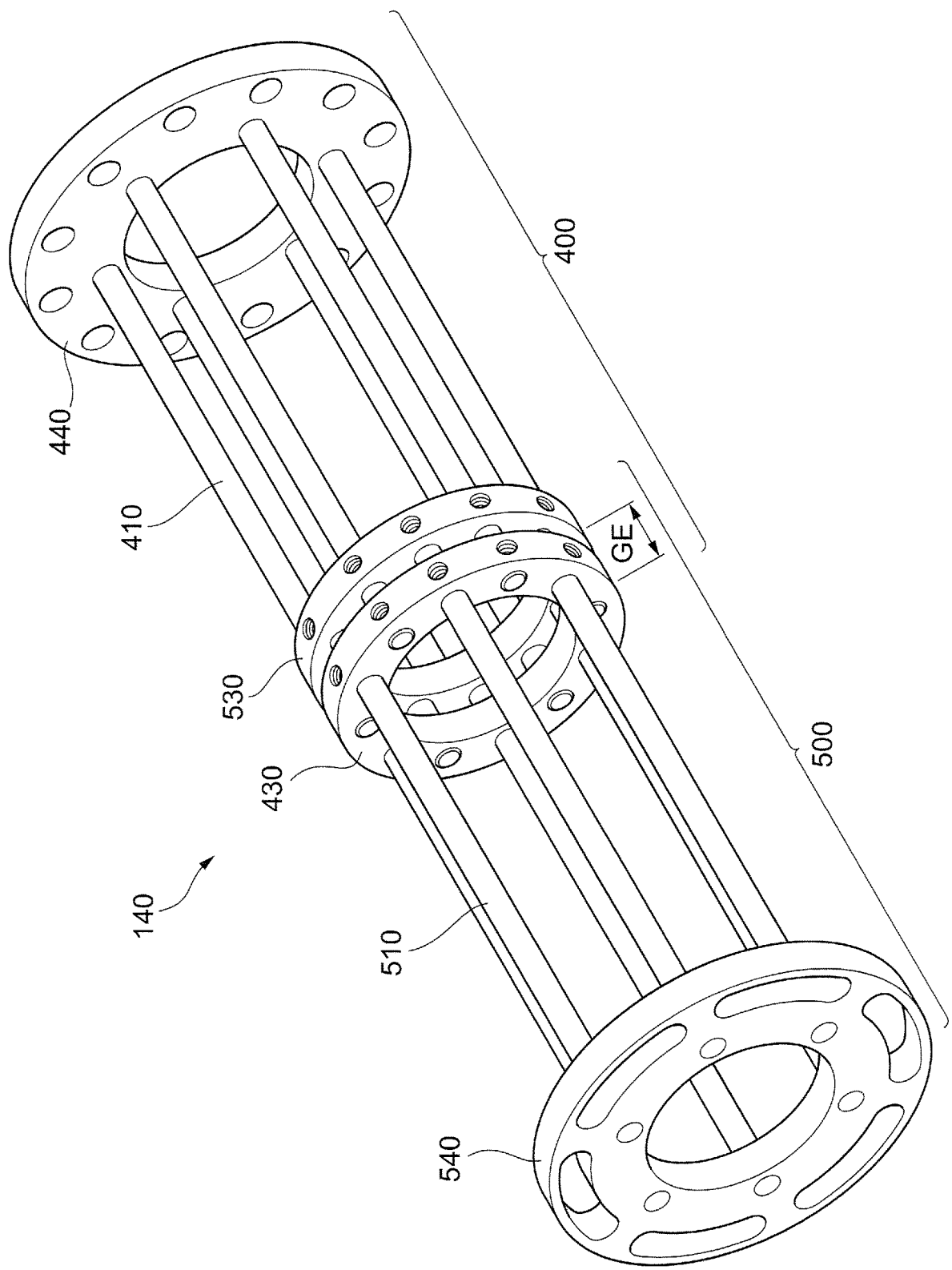
FIG. 6 is a diagram showing a state of the extendable part after the extendable part is extended.

FIG. 6 is a diagram showing a state of the extendable part 140 after the extendable part 140 is extended.

When the extendable part 140 is extended, the upstream-side fixed member 440 and the downstream-side fixed member 540 are separated from each other. This increases the full length of the extendable part 140.

Moreover, when the extendable part 140 is extended, the length of the overlapping portion GE positioned between the first fixing member 430 and the second fixing member 530 (the separation distance between the first fixing member 430 and the second fixing member 530) is reduced.

Note that, in the exemplary embodiment, irrespective of the state of the extendable part 140 (irrespective of whether the extendable part 140 is in the extended state or the contracted state), the gap (clearance) between the disc-shaped members 300 and the upstream-side guidance members 410, the downstream-side guidance members 510 is constant.

Here, in the exemplary embodiment, as shown in FIG. 1, the moving devices 100 are installed among the various kinds of processing devices to move the disc-shaped members 300 among the processing devices.

Here, in a factory or the like, in installing the moving devices 100 or processing devices, due to a dimensional tolerance of each device, installation error or the like, the full length of the moving device 100 is increased beyond necessity, or the full length of the moving device 100 is decreased to be smaller than the required length.

Increase or decrease of the full length of the moving device 100 in this manner causes troubles in installing the moving devices 100 or the processing devices.

Specifically, increase of the full length of the moving device 100 generates necessity of cutting or grinding members constituting the moving device 100, to thereby require efforts. Moreover, decrease of the full length of the moving device 100 causes necessity of, for example, detaching an end portion of the moving device 100 that has been once assembled, preparing a longer end portion, and thereafter, attaching the longer end portion.

In contrast thereto, in the configuration of the exemplary embodiment, in the case where the full length of the moving device 100 is increased or decreased beyond necessity, the extendable part 140 is extended or contracted.

More specifically, at least one of the upstream-side guidance part 400 and the downstream-side guidance part 500 is moved along the conveyance direction of the disc-shaped members 300.

This makes it possible to change the full length of the moving device 100 easier in the exemplary embodiment.

Note that, after the full length of the moving device 100 is changed, in the exemplary embodiment, the first fixing member 430 (refer to FIG. 3) is fixed to the downstream-side guidance members 510 and the second fixing member 530 is fixed to the upstream-side guidance members 410.

Specifically, the screw is attached to each of the screw through holes 98 in the first fixing member 430 (the screw through holes 98 indicated by the reference sign 3C in FIG. 3), to thereby fix the first fixing member 430 to each of the plurally-provided downstream-side guidance members 510.

Moreover, the screw is attached to each of the screw through holes 98 in the second fixing member 530 (the screw through holes 98 indicated by the reference sign 3D in FIG. 3), to thereby fix the second fixing member 530 to each of the plurally-provided upstream-side guidance members 410.

Here, in the exemplary embodiment, as described above, the first fixing member 430 is fixed to each of the downstream-side guidance members 510 and the second fixing member 530 is fixed to each of the upstream-side guidance members 410.

As a result, in the exemplary embodiment, plural points in the longitudinal direction in each of the plurally-provided downstream-side guidance members 510 are fixed to the upstream-side guidance part 400. Moreover, plural points in the longitudinal direction in each of the plurally-provided upstream-side guidance members 410 are fixed to the downstream-side guidance part 500.

More specifically, the downstream-side guidance members 510 are fixed to the upstream-side guidance part 400 (the upstream-side guidance members 410) at the portion where the second fixing member 530 is provided, and fixed to the upstream-side guidance part 400 (the upstream-side guidance members 410) at the portion where the first fixing member 430 is provided.

In other words, the downstream-side guidance members 510 are fixed to the upstream-side guidance part 400 at two locations; the location where the first fixing member 430 is provided and the location where the second fixing member 530 is provided.

More specifically, the downstream-side guidance members 510 are fixed to the upstream-side guidance part 400 (the upstream-side guidance members 410) at two locations indicated by reference signs 3X and 3Y in FIG. 3.

To additionally describe, in the exemplary embodiment, the downstream-side guidance members 510 are fixed to the upstream-side guidance members 410 via the first fixing member 430 and the second fixing member 530 at the installation positions different from each other in the conveyance direction. Consequently, the plural points in the longitudinal direction in each of the downstream-side guidance members 510 are fixed to the upstream-side guidance part 400.

Moreover, the upstream-side guidance members 410 are fixed to the downstream-side guidance part 500 (the downstream-side guidance members 510) at the portion where the first fixing member 430 is provided, and fixed to the downstream-side guidance part 500 (the downstream-side guidance members 510) at the portion where the second fixing member 530 is provided.

In other words, the upstream-side guidance members 410 are fixed to the downstream-side guidance part 500 at two locations; the location where the first fixing member 430 is provided and the location where the second fixing member 530 is provided.

More specifically, the upstream-side guidance members 410 are fixed to the downstream-side guidance part 500 (the downstream-side guidance members 510) at two locations indicated by the reference signs 3X and 3Y in FIG. 3.

To additionally describe, in the exemplary embodiment, the upstream-side guidance members 410 are fixed to the downstream-side guidance members 510 via the first fixing member 430 and the second fixing member 530 at the installation positions different from each other in the conveyance direction.

Consequently, the plural points in the longitudinal direction in each of the plural upstream-side guidance members 410 are fixed to the downstream-side guidance part 500.

[Attachment of Cover Member]

In the exemplary embodiment, after the extension or contraction of the extendable part 140 is completed and the upstream-side guidance part 400 and the downstream-side guidance part 500 are fixed to each other by use of the above screws, a cover member 89 composed of a resin material is attached to each of the upstream-side guidance members 410 and the downstream-side guidance members 510.

Note that, similarly, the cover member 89 is attached to the guidance member 131 provided to the guidance device main body part 130 (refer to FIG. 1).

Figure 7:
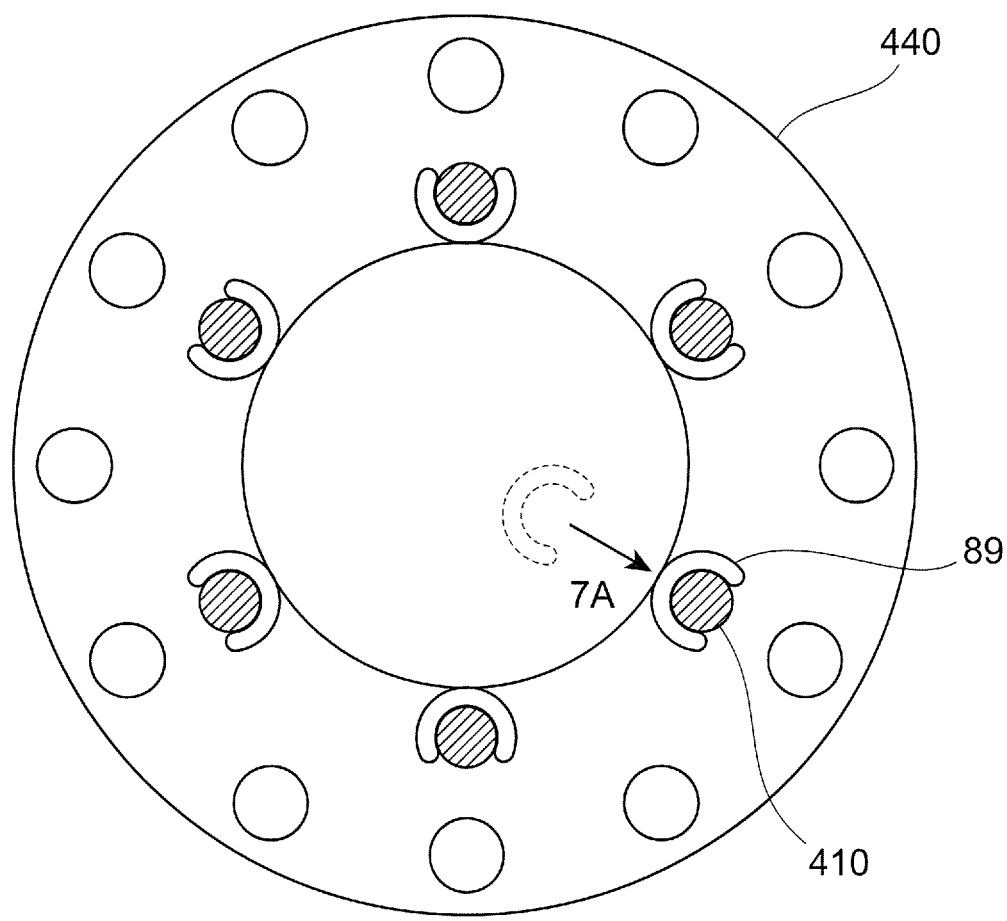
FIG. 7 shows a cross-sectional view along the VII-VII line in FIG. 3 after a cover member is attached.

FIG. 7 shows a cross-sectional view along the VII-VII line in FIG. 3 after the cover member 89 is attached. To put it another way, FIG. 7 shows a state after the cover members 89 are attached to portions of the upstream-side guidance members 410, the portions being positioned between the upstream-side fixed member 440 and the second fixing member 530.

In the exemplary embodiment, as indicated by an arrow 7A, the cover member 89 composed of a resin material and having a C-shaped cross section is attached to each of the upstream-side guidance members 410. Consequently, the disc-shaped members 300 are less likely to be scratched as compared to the case where the upstream-side guidance members 410 are directly brought into contact with the disc-shaped members 300.

Note that, other than the above, the cover members 89 are attached to the upstream-side guidance members 410 and the upstream-side guidance members 510 positioned at the overlapping portion GE.

In addition, the cover members 89 are also attached to portions of the downstream-side guidance members 510, the portions being positioned between the first fixing member 430 and the downstream-side fixed member 540 (the portions indicated by a reference sign 3H in FIG. 3).

Figure 8:
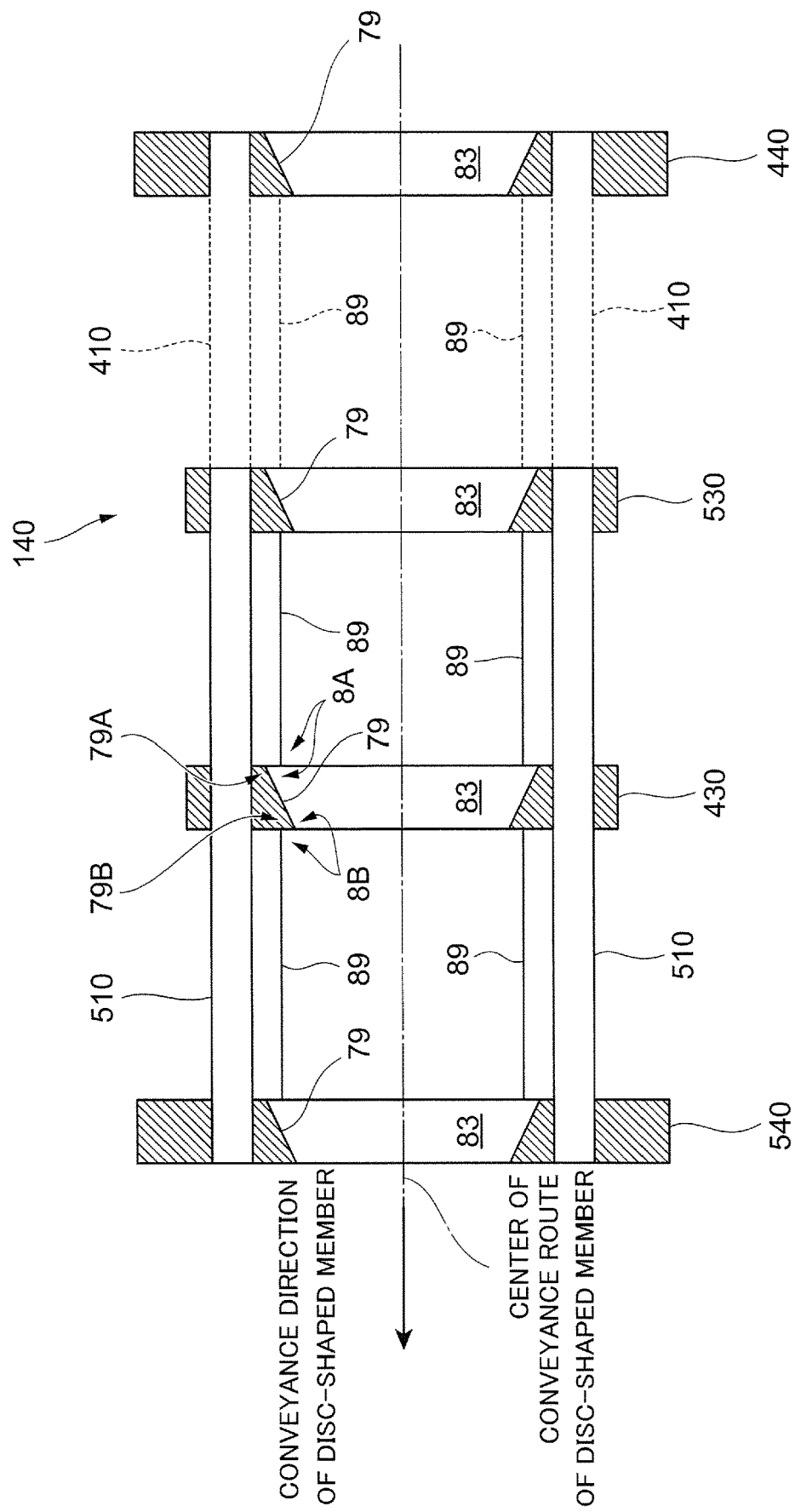
FIG. 8 is a cross-sectional view of the extendable part along the VIII-VIII line in FIG. 4B.

FIG. 8 is a cross-sectional view of the extendable part 140 along the VIII-VIII line in FIG. 4B.

Note that, in FIG. 8, the state of the cross section of the entire region in the longitudinal direction of the extendable part 140 is shown. Moreover, in FIG. 8, the upstream-side guidance members 410 that originally do not exist on the VIII-VIII line in FIG. 4B are also shown. In addition, FIG. 8 also shows the cover members 89.

In the exemplary embodiment, as shown in FIG. 8, an inclination is imparted to an inner circumferential surface 79 of each of the upstream-side fixed member 440, the downstream-side fixed member 540, the first fixing member 430 and the second fixing member 530.

Specifically, in each of the upstream-side fixed member 440, the downstream-side fixed member 540, the first fixing member 430 and the second fixing member 530, the diameter of the inner circumferential surface 79 is not constant; the diameter of the inner circumferential surface 79 increases as moving toward the upstream side in the conveyance direction of the disc-shaped members 300.

In other words, in each of the upstream-side fixed member 440, the downstream-side fixed member 540, the first fixing member 430 and the second fixing member 530, the inner circumferential surface 79 is provided with an inclination that increases the diameter of the inner circumferential surface 79 as moving toward the upstream side in the conveyance direction.

Consequently, it becomes easier for the disc-shaped members 300 to pass through each of the upstream-side fixed member 440, the downstream-side fixed member 540, the first fixing member 430 and the second fixing member 530 as compared to the case in which the inclination is not imparted.

Further, in the exemplary embodiment, as indicated by a reference sign 8A in FIG. 8, the surface of the cover member 89 is positioned closer to the center of the conveyance route of the disc-shaped members 300 than an upstream-side end portion 79A of the inner circumferential surface 79.

More specifically, in the case where the upstream-side end portion 79A and the surface of the cover member 89 positioned at the upstream side of the upstream-side end portion 79A are compared, the surface of the cover member 89 is positioned closer to the center of the conveyance route of the disc-shaped members 300 than the upstream-side end portion 79A.

Consequently, as compared to the case where the upstream-side end portion 79A is positioned closer to the center of the conveyance route than the surface of the cover member 89, the disc-shaped members 300 are less likely to be caught on the upstream-side end portions 79A, and thereby the disc-shaped members 300 are smoothly conveyed.

Further, in the exemplary embodiment, as indicated by a reference sign 8B in FIG. 8, an downstream-side end portion 79B of the inner circumferential surface 79 is positioned closer to the center of the conveyance route of the disc-shaped members 300 than the surface of the cover member 89.

More specifically, in the case where the downstream-side end portion 79B and the surface of the cover member 89 positioned at the downstream side of the downstream-side end portion 79B are compared, the downstream-side end portion 79B is positioned closer to the center of the conveyance route of the disc-shaped members 300 than the surface of the cover member 89.

Consequently, as compared to the case where the surface of the cover member 89 is positioned closer to the center of the conveyance route than the downstream-side end portion 79B, the disc-shaped members 300 are less likely to be caught on the cover members 89, and thereby the disc-shaped members 300 are smoothly conveyed.

Comparative Example

Figure 9:
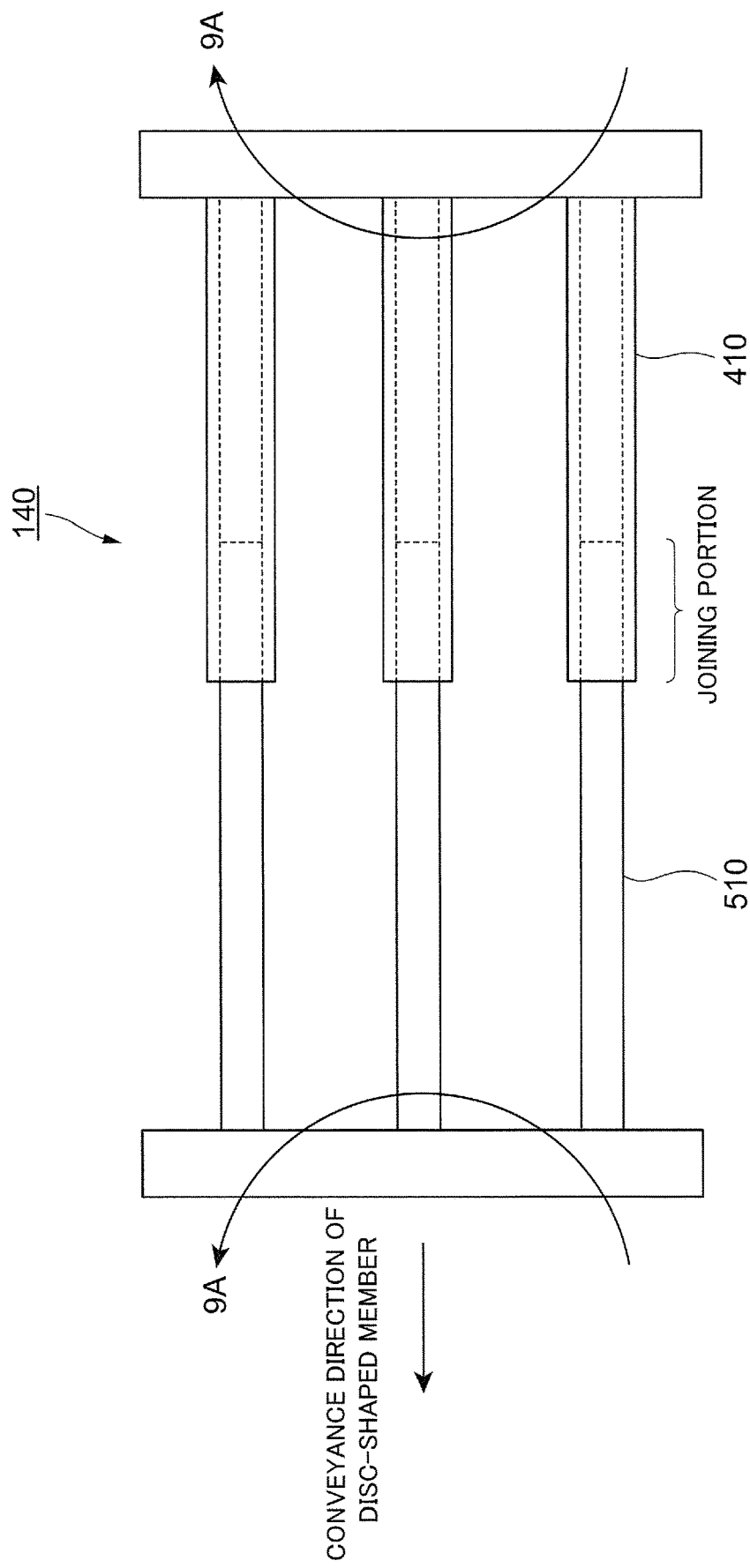
FIG. 9 is a diagram showing Comparative example of the extendable part.

FIG. 9 is a diagram showing Comparative example of the extendable part 140. Note that FIG. 9 shows a state in which the extendable part 140 is viewed from the lateral side.

In Comparative example, the upstream-side guidance member 410 and the downstream-side guidance member 510 are coaxially disposed. In addition, Comparative example has a configuration in which the upstream-side guidance member 410 is formed into the cylindrical shape and the downstream-side guidance member 510 is inserted into the upstream-side guidance member 410. In this Comparative example, the downstream-side guidance member 510 comes in and out of the upstream-side guidance member 410, to thereby change the full length of the extendable part 140.

Here, in general, when the upstream-side guidance member 410 and the downstream-side guidance member 510 are coaxially disposed, the upstream-side guidance member 410 and the downstream-side guidance member 410 interfere with each other.

In this Comparative example, the upstream-side guidance member 410 is formed into a hollow cylindrical member to avoid the interference. By the way, when the guidance member is formed to be hollow as described above, the strength thereof is degraded as compared to the case where the member is solid.

In contrast thereto, in the configuration of the exemplary embodiment, the upstream-side guidance member 410 and the downstream-side guidance member 510 are not coaxially disposed; in the circumferential direction of the disc-shaped member 300, the installation position of the upstream-side guidance member 410 and the installation position of the downstream-side guidance member 510 are different from each other.

In this case, both the upstream-side guidance member 410 and the downstream-side guidance member 510 can be the solid members, and thereby degradation of the strength in the extendable part 140 is less likely to occur.

Moreover, in Comparative example, in the case where a torque as indicated by an arrow 9A in the figure acts on the upstream-side guidance member 410 and the downstream-side guidance member 510, the extendable part 140 is likely to be deformed. More specifically, the extendable part 140 is likely to be deformed, such as bending in the extendable part 140 around the center portion in the longitudinal direction of the extendable part 140 (around a joining portion of the upstream-side guidance member 410 and the downstream-side guidance member 510).

To additionally describe, in Comparative example, in the case where a load to move end portions on the free-end side of the upstream-side guidance member 410 and the downstream-side guidance member 510 in the direction crossing the conveyance direction acts on the extendable part 140, the extendable part 140 is likely to be deformed.

In contrast thereto, in the configuration of the exemplary embodiment, the plural points in the longitudinal direction in each of the downstream-side guidance members 510 are fixed to the upstream-side guidance part 400. Moreover, the plural points in the longitudinal direction in each of the upstream-side guidance members 410 are fixed to the downstream-side guidance part 500. In this case, even though the load working in the direction crossing the conveyance direction acts on the extendable part 140, the extendable part 140 is less likely to be deformed.

In addition, as in Comparative example, if provided is a configuration in which the upstream-side guidance member 410 is formed into the cylindrical shape and the downstream-side guidance member 510 is inserted into the upstream-side guidance member 410, a step is generated at the joining portion of the upstream-side guidance member 410 and the downstream-side guidance member 510.

In contrast thereto, in the configuration of the exemplary embodiment, it is possible to suppress generation of the step and to smoothly convey the disc-shaped members 300.

[Other Configurations]

In the exemplary embodiment described above, the case where the extendable part 140 is disposed along the horizontal direction has been described; however, the extendable part 140 may be disposed along the vertical direction or an oblique direction (a direction crossing the horizontal direction and the vertical direction).

Moreover, in the above, the case where the upstream-side guidance members 410 and the downstream-side guidance members 510 are linearly formed has been described; however, a constant curvature may be imparted to each of the upstream-side guidance members 410 and the downstream-side guidance part 500. In this case, at least one of the upstream-side guidance part 400 and the downstream-side guidance part 500 is moved along the conveyance route in an arc shape according to the curvature to change the full length of the extendable part 140.

Moreover, in the above, the case where the moving devices 100 are provided during the manufacturing process of the can lids has been described; however, the moving devices 100 may be provided during the manufacturing process of the beverage cans.

In the manufacturing process of the beverage cans, the disc-shaped members 300 (the disc-shaped members 300 to which the tabs have already been attached (the disc-shaped members 300 in the completed state as the can lids)) are also conveyed. In this case, similar to the above, due to a dimensional tolerance of each device, the full length of the moving device 100 is increased beyond necessity, or the full length of the moving device 100 is decreased to be smaller than the required length.

Provision of the extendable part 140 of the exemplary embodiment makes it possible to install each processing device also in the manufacturing process of the beverage cans (a beverage can manufacturing factory) easier.

Note that, in the manufacturing process of the beverage cans, an attaching device is provided, and thereby the disc-shaped member 300 (the disc-shaped member 300 to which the tab has already been attached) is attached to an opening portion of a can main body after being filled with a beverage through the opening portion.

More specifically, the disc-shaped member 300 is placed on the can main body, and thereafter, bending is performed on both the outer circumferential edge of the disc-shaped member 300 and the opening edge of the can main body, to thereby attach the disc-shaped member 300 to the opening portion of the can main body. To additionally describe, by so-called seaming, the disc-shaped member 300 is attached to the opening portion of the can main body. Consequently, a beverage can filled with a beverage is completed.

REFERENCE SIGNS LIST

1 Can body manufacturing system
30 Sealing agent application device
80 Through hole
95 Through hole
100 Moving device
110 Conveyance device
120 Guidance device
300 Disc-shaped member
400 Upstream-side guidance part
410 Upstream-side guidance member
430 First fixing member
440 Upstream-side fixed member
500 Downstream-side guidance part
510 Downstream-side guidance member
530 Second fixing member
540 Downstream-side fixed member
620 Circle (Virtual circle)
GA Guidance region
GB Guidance region
GE Overlapping portion

The invention claimed is:

1. A guidance device comprising:
an upstream-side guidance part including plural upstream-side guidance members disposed along a conveyance route of a disc-shaped member to be conveyed in a thickness direction thereof and to be used as a can lid, the upstream-side guidance members being disposed at positions different from one another in a circumferential direction of the disc-shaped member to be conveyed, to thereby guide the disc-shaped member; and
a downstream-side guidance part including plural downstream-side guidance members disposed at positions different from one another in the circumferential direction of the disc-shaped member to be conveyed, to thereby guide the disc-shaped member having been guided by the upstream-side guidance members and conveyed, wherein
each of the positions of the upstream-side guidance members in the circumferential direction is different from each of the positions of the downstream-side guidance members in the circumferential direction, and at least one of the upstream-side guidance part and the downstream-side guidance part is able to move forward and backward with respect to the other;
wherein a fixed member to be fixed to a fixing location is attached to at least one of end portions of the plural upstream-side guidance members positioned on an upstream side in a conveyance direction of the disc-shaped member and end portions of the plural downstream-side guidance members positioned on a downstream side in the conveyance direction of the disc-shaped member,
a through hole for passing a fastening member is formed in the fixed member, and
the through hole is formed into an elongate-hole shape.

2. The guidance device according to claim 1, wherein a portion where both the upstream-side guidance part and the downstream-side guidance part are positioned exists beside the conveyance route of the disc-shaped member, and guidance of the disc-shaped member by the downstream-side guidance part is started amidst performance of guidance of the disc-shaped member by the upstream-side guidance part.

3. The guidance device according to claim 2, wherein the plural upstream-side guidance members and the plural downstream-side guidance members are placed on a same circle on a plane orthogonal to a conveyance direction of the disc-shaped member, the plane passing both the upstream-side guidance part and the downstream-side guidance part.

4. The guidance device according to claim 3, wherein the upstream-side guidance members and the downstream-side guidance members are alternately disposed in a circumferential direction of the same circle.

5. A device for moving a disc-shaped member comprising:
a conveyance device providing a driving force to a disc-shaped member to be used as a can lid and conveying the disc-shaped member; and a guidance device guiding the disc-shaped member conveyed by the conveyance device, wherein
the guidance device comprises the guidance device according to claim 1.

6. A can lid manufacturing system comprising:
a conveyance device providing a driving force to a disc-shaped member to be used as a can lid and conveying the disc-shaped member;
a guidance device guiding the disc-shaped member conveyed by the conveyance device; and
a processor performing predetermined processing to the disc-shaped member, wherein the guidance device comprises the guidance device according to claim 1.

7. A beverage can manufacturing system comprising:
a conveyance device providing a driving force to a disc-shaped member to be used as a can and conveying the disc-shaped member;
a guidance device guiding the disc-shaped member conveyed by the conveyance device; and
an attaching device attaching the disc-shaped member to an opening portion of a can lid filled with a beverage, wherein
the guidance device comprises the guidance device according to claim 1.

8. A guidance device comprising:
an upstream-side guidance part including plural upstream-side guidance members disposed along a conveyance route of a disc-shaped member to be used as a can lid, to thereby guide the disc-shaped member; and
a downstream-side guidance part including plural downstream-side guidance members disposed along the conveyance route, to thereby guide the disc-shaped member having been guided by the upstream-side guidance members and conveyed, wherein a guidance region in a conveyance direction of the disc-shaped member where the upstream-side guidance part guides the disc-shaped member and a guidance region in the conveyance direction where the downstream-side guidance part guides the disc-shaped member partially overlap in the conveyance direction, and movement of at least one of the upstream-side guidance part and the downstream-side guidance part toward the other changes a length in the conveyance direction of a portion where the guidance regions overlap, and
plural points in a circumferential direction in each of the plural downstream-side guidance members constituting the downstream-side guidance part are fixed to the upstream-side guidance part, and plural points in a circumferential direction in each of the plural upstream-side guidance members constituting the upstream-side guidance part are fixed to the downstream-side guidance part;
wherein the guidance device further comprises:
a first fixing member fixed to portions of the plural upstream-side guidance members positioned on a downstream side in the conveyance direction, the first fixing member coupling the plural upstream-side guidance members and being slidably connected to the downstream-side guidance members; and
a second fixing member fixed to portions of the plural downstream-side guidance members positioned on an upstream side in the conveyance direction, the second fixing member coupling the plural downstream-side guidance members and being slidably connected to the upstream-side guidance members,
wherein the upstream-side guidance members are fixed to the downstream-side guidance members via the first fixing member and the second fixing member, to thereby fix the plural points in the circumferential direction of the upstream-side guidance members to the downstream-side guidance part, and
the downstream-side guidance members are fixed to the upstream-side guidance members via the first fixing member and the second fixing member, to thereby fix the plural points in the circumferential direction of the downstream-side guidance members to the upstream-side guidance part;
wherein plural through holes are formed in each of the first fixing member and the second fixing member, the plural through holes being moved along a moving direction when one of the guidance parts moves with respect to the other, and
each of the plural downstream-side guidance members is passed through each of the through holes in the first fixing member, and each of the plural upstream-side guidance members is passed through each of the through holes in the second fixing member.

\* \* \* \* \*